United States Patent [19]

Meininger et al.

[11] 4,139,527
[45] Feb. 13, 1979

[54] FIBER REACTIVE MONOAZO DYESTUFFS CONTAINING A —SO₂—CH₂—CH₂—O—PO₃H₂ GROUP

[75] Inventors: Fritz Meininger, Frankfurt am Main; Klaus Hunger, Kelkheim; Hartmut Springer, Frankfurt am Main, all of Fed. Rep. of Germany

[73] Assignee: Hoechst Aktiengesellschaft, Frankfurt am Main, Fed. Rep. of Germany

[21] Appl. No.: 389,660

[22] Filed: Aug. 21, 1973

Related U.S. Application Data

[63] Continuation-in-part of Ser. No. 852,468, Aug. 22, 1969, abandoned.

[30] Foreign Application Priority Data

Aug. 28, 1968 [DE] Fed. Rep. of Germany ....... 1793301

[51] Int. Cl.² .................. C09B 62/74; C09B 62/46
[52] U.S. Cl. .................... 260/199; 260/155;
260/193; 260/194; 260/195; 260/196; 260/197;
260/198; 260/200; 260/201; 260/202; 260/203;
260/204; 260/205; 260/206; 260/207;
260/207.1
[58] Field of Search ............... 260/194, 195, 196, 197, 260/198, 199, 200, 201, 202

[56] References Cited

U.S. PATENT DOCUMENTS

| | | | |
|---|---|---|---|
| 2,670,265 | 2/1954 | Heyna et al. .................. | 8/49 |
| 3,135,730 | 6/1964 | Heyna et al. .................. | 260/199 X |
| 3,202,652 | 8/1965 | Meininger et al. ............. | 260/200 |
| 3,232,927 | 2/1966 | Randall et al. ................ | 260/199 X |
| 3,414,579 | 12/1968 | Remy .......................... | 260/199 X |
| 3,531,459 | 9/1970 | Chiddix et al. ................ | 260/197 X |

*Primary Examiner*—Charles F. Warren
*Attorney, Agent, or Firm*—Curtis, Morris & Safford

[57] ABSTRACT

A water-soluble monoazo-dyestuff having in form of the free acid the formula

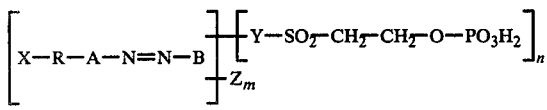

wherein A represents as a radical of a diazo component phenyl; phenyl substituted by lower alkyl, lower alkylsulfonyl, lower alkoxy, carboxyl, trifluoromethyl, cyano, fluorine, chlorine, bromine, sulfonamido and carbonamido; naphthyl, nitronaphthylene,

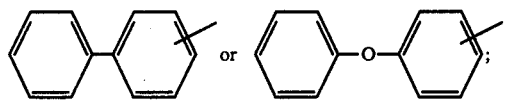

X represents hydrogen; phenyl; nitrophenylene or naphthyl, R represents as a bridging member —SO₂—, —CO—, —S—, —CO—NH—, —NH—CO—, —SO₂—NH—, —NH—SO₂—, —CH₂—, —NH— or —N(lower alkyl)—; B represents as the radical of a coupling component N,N-di(lower alkyl)amino-phenylene, N,N-di (lower alkyl)amino-chloro-phenylene; hydroxyquinoline; diphenylamine; hydroxynaphthylene; hydroxynaphthylene substituted by acetylamino, benzoylamino or

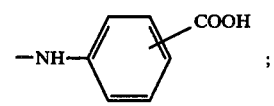

aminonaphthylene;

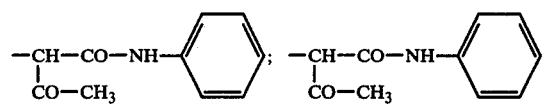

substituted on the benzene nucleus by lower alkyl, lower alkoxy, chlorine and bromine; Z represents hydrogen, —COOH or —SO₃H, Y represents a direct linkage or one of the groupings —CH₂—, —CH₂13 CH₂—, —NH— or —N(lower alkyl)—, the said groupings —Y—SO₂—CH₂—CH₂—O—PO₃H₂ and Z being linked to A, B or X, n stands for an integer from 1 to 3 and m stands for an integer from 1 to 5, said dyestuffs being suitable for the dyeing or printing of leather or fibrous materials consisting of native or regenerated cellulose, wool, silk or polyamides, the dyeings and prints obtained on said materials being distinguished by deep tints and very good fastness properties to light and wetting.

9 Claims, No Drawings

FIBER REACTIVE MONOAZO DYESTUFFS CONTAINING A —SO$_2$—CH$_2$—CH$_2$—O—PO$_3$H$_2$ GROUP

This application is a continuation application of pending application Ser. No. 852,468 filed August 22, 1969, now abandoned.

The present invention provides new monoazo dyestuffs which are very easily soluble in water and in form of the free acid correspond to the general formula (1)

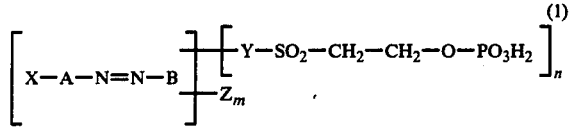

wherein A represents a radical of the benzene or naphthalene series, X represents a hydrogen atom or a radical of the benzene or naphthalene series linked to A via the bridging member —CH$_2$—, —CO—, —NH—, —N-(alkyl)—, —SO$_2$—, —SO$_2$NH—, —NH—SO$_2$—, —CO—NH—, —NH—CO—, or —S—, B represents a radical of a coupling component the coupling capability of which is based on the presence of a phenolic, naphtholic or enolic hydroxyl group or a primary, secondary or tertiary amino group, z represents a hydrogen atom or, preferably, a hydrosolubilizing group, in particular a carboxylic or sulfonic acid group, Y represents a direct linkage or the group —CH$_2$—, —CH$_2$—CH$_2$—, —NH— or —N(alkyl)— and in which the groupings —Y—SO$_2$—CH$_2$—CH$_2$—O—PO$_3$H$_2$ and Z are linked to A, B and/or X, n stands for an integer from 1 to 3, and m represents an integer from 1 to 5.

Moreover, this invention provides a process for preparing said dyestuffs.

The aromatic nuclei of the radicals A, B and X may contain further substituents, for example alkyl groups such as methyl, ethyl, propyl or butyl groups, alkoxy groups such as methoxy or ethoxy groups, aryl radicals, for example phenyl radicals, halogen atoms such as fluorine, chlorine or bromine atoms, primary, secondary or tertiary amino groups, acylamino groups such as acetyl or acryloylamino groups, acyl groups, for example, propionyl groups, moreover cyano, nitro, alkylsulfone, sulfonic acid amide, carboxylic acid amide and/or trifluoromethyl groups.

The new monoazo dyestuffs having the said general formula (1) can be prepared (a) by combining a diazotized aromatic amine of the general formula (2)

$$X—A—NH_2 \quad (2)$$

in which X and A are defined as above and in which X and/or A may contain hydrosolubilizing groups, preferably carboxylic or sulfonic acid groups and/or the grouping of the formula (3)

$$—Y—SO_2—CH_2—CH_2—O—PO_3H_2 \quad (3)$$

with a coupling component of the general formula (4)

$$H—B \quad (4)$$

wherein B has the meaning given above and may contain hydrosolubilizing groups, preferably carboxylic or sulfonic acid groups and/or the grouping of the formula (3) mentioned the diazo and coupling components being selected such that the ready monoazo dyestuff contains at least one grouping of said formula (3)

(b) by converting monoazo dyestuffs of the general formula (5)

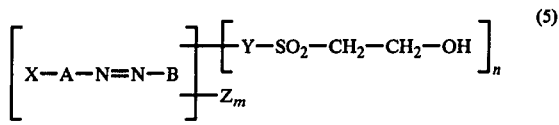

wherein A, B, X, Y, Z, m and n have the meanings given above with phosphorylating agents in known manner into the corresponding phosphoric acid monoesters.

Suitable coupling components corresponding to the general formula (4) mentioned are, for example, the compounds of the benzene or naphthalene series, for example, 3-chloro-1-diethylamino-benzene, 1-hydroxy-naphthalene-3,6-disulfonic acid, 8-benzoylamino-1-hydroxynaphthalene-3,6-disulfonic acid, 6-acetylamino-1-hydroxy-naphthalene-3-sulfonic acid, 7-(4'-caboxyl-phenylamino)-1-hydroxy-naphthalene-3-sulfonic acid, 7-(N-methyl-N-isoethionylamino)-1-hydroxy-naphthalene-3-sulfonic acid phosphoric acid phosphoric acid monoester, moreover compounds of the quinoline series, for example, β-hydroxyquinoline-4-sulfonic acid, compounds of the diphenylamino series, for example diphenylamine, furthermore compounds of the series consisting of acylacetic acid arylamides such as acetoacetic acid phenylamide which may be substituted in the phenyl radical by lower alkyl and/or lower alkoxy groups and/or chlorine or bromine atoms, for example β-hydroxyethyl (2.5-dimethoxy-4-acetoacetylaminephenyl)-sulfone-phosphoric acid monoester.

As phosphorylating agents in the procedure according to method (b) for example phosphoric, pyrophosphoric, metaphosphoric or polyphosphoric acid, alkylesters or acid alkylesters of condensed phosphoric acids or mixtures of phosphoric acid with phosphorus pentoxide or phosphorus oxy chloride may serve.

The reaction of the monoazo compounds of said formula (3) with phosphoric acid or with the condensed phosphoric acids mentioned or alkyl esters or acid alkylesters thereof is, advantageously conducted at elevated temperatures, preferably ranging from 50° to 150° C. in an excess of said reagents in order to reduce the formation of phosphoric acid diesters to the extent possible. It is also possible to proceed in the presence of inert solvents or diluents, for example toluene, chlorobenzene or chloronaphthalene. When condensed phosphoric acids or alkylesters or acid alkylesters are employed, it may be advantageous to, subsequently, subject the resulting reaction mixture to hydrolysis under mild conditions, for example, with hot water, in order to convert the pyrophosphoric or polyphosphoric acid monoesters formed as by-products into phosphoric acid monoesters.

The reaction of the monoazo compounds of formula (5) with phosphorus oxychloride, advantageously proceeds with exclusion of moisture in excess phosphorus oxychloride with cooling or moderate heating, if desired, in the presence of a tertiary amine, for example pyridine, lutidine or dimethylaniline and/or another solvent e.g. benzene or chlorobenzene. It is advantageous to continuously remove the hydrogen chloride formed during the reaction by slightly evacuating the reaction vessel or passing through the reaction mixture an inert gas.

In the reaction of the monoazo compounds of formula (5) with phosphorus oxychloride first phosphoric acid monoester dichlorides of these compounds are formed which must be saponified in a second reaction step. The saponification is suitably performed for example with water, dilute acids or bases while cooling, at room temperature or with heating.

The monoazo dyestuffs of the invention are isolated according to both methods described by salting out, for example, with sodium chloride or potassium chloride and/or acidification with a mineral acids or concentration of the neutral or weakly acid, aqueous dyestuff solution, preferably at moderately elevated temperature, under reduced pressure.

The monoazo dyestuffs obtainable according to the instant process are highly suitable for dyeing or printing leather or fibrous materials consisting of wool, silk, or polyamides in particuclar cellulose, for example, cotton, regenerated cellulose or linen. They may be used according to dyeing or printing methods usual in industry for reactive dyestuffs and yield on cellulosic materials in the presence of alkaline agents deep dyeings and prints very fast to light and wetting.

In comparison with the monoazo dyestuffs disclosed in German Patents 965,902, 1,126,547, 1,158,645 and 1,246,906 having the most closely related structure the monoazo dyestuffs of the invention are superior with respect to better stability of the alkaline printing pastes and dyebaths.

The following Examples illustrate the invention but they are not intended to limit it thereto the parts and percentages being by weight unless otherwise stated.

EXAMPLE 1

30.8 parts of β-hydroxyethyl-(4-methoxy-3-aminophenyl)sulfone phosphoric acid ester were dissolved neutral in 100 parts by volume of water with addition of sodium carbonate and mixed with 20 parts by volume of 5N sodium nitrate solution.

The solution was allowed to run slowly into 35 parts by volume of concentrated hydrochloric acid and 100 parts of pulverized ice. After completion of the diazotization 1 part of amidosulfonic acid was added and the reaction mixture was combined with a neutral solution of 41.2 parts of 6-acetylamino-1-hydroxynaphthalene-3-sulfonic acid of 68.2% strength in 195 parts by volume of water.

Coupling was performed at 10°–15° C. at a pH ranging from 6 to 6.5 maintained by strewing into the reaction mixture sodium carbonate. The monoazo dyestuff obtained which in form of the free acid corresponded to the formula

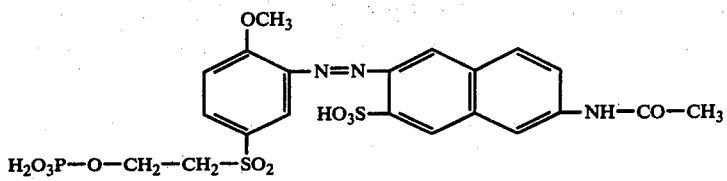

was salted out with 25% by volume of sodium chloride referred to the dry weight of the solution, filtered off, washed with sodium chloride solution and dried in vacuo at 40°–50° C.

An orange-red powder was obtained easily soluble in water while giving an orange colour. The dyestuff yielded on cotton fabrics in the presence of sodium carbonate a clear deep print very fast to light and wetting.

EXAMPLE 2

20.1 parts of β-hydroethyl-(4-aminophenyl)-sulfone were introduced at 60°–70° C. into a solution of 35 parts of phosphorus pentoxide in 45 parts of phosphoric acid having 84.5% strength. The mixture obtained was heated to 78°–82° C. at which temperature it was maintained for four hours while stirring, diluted then, with 50 parts by volume of 5N hydrochloric acid and after another 15 minutes, cooled to 5°–10° C. by strewing into the reaction mixture pulverized ice. The batch was diazotized in known manner with 20 parts by volume of 5N sodium nitrate solution and combined with a neutral solution of 57.7 parts of 2-benzoylamino-8-hydroxynaphthalene-4,6-disulfonic acid of 73.5% strength in 295 parts by volume of water. By addition of sodium carbonate coupling was performed within a ph range from 6 to 6.5. The dyestuff formed which corresponded to the formula

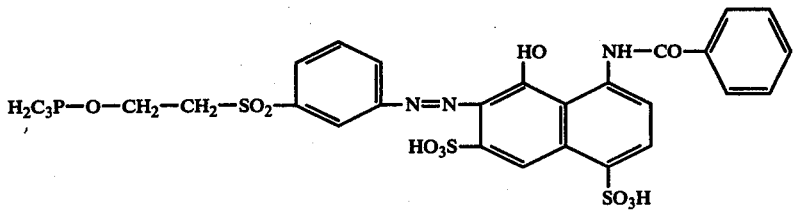

was salted out by strewing into the reaction mixture sodium chloride, filtered and dried.

A red powder was obtained dissolving in water with a red coloration. The dyestuff yielded on cotton fabrics in the presence of sodium carbonate a brilliant red print very fast to light and wetting.

EXAMPLE 3

27.8 parts of 3-amino-4-methoxy-toluene-6-sulfonic acid having 78% strength were dissolved neutral in 200 parts by volume of water with addition to dilute sodium hydroxide solution and mixed with 25 parts by volume of concentrated hydrochloric acid. The whole was diazotized at 0°–5° C. in known manner with sodium nitrite and neutralized subsequently, up to a pH of 6.5, whereupon the diazo suspension obtained was combined with a solution of 36.6 parts of β-hydroxy-ethyl-(3-acetoacetyl-aminophenyl)-sulfone phosphoric acid ester in 230 parts by volume of water and coupling was performed by addition of sodium carbonate at a pH between 6 and 6.5. For isolating the formed dyestuff which in form of the free acid corresponded to the formula

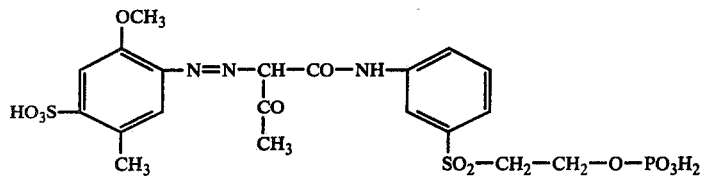

the reaction mixture was acidified with concentrated hydrochloric acid and the dyestuff was salted out with sodium chloride. After filtering and drying, a yellow powder was obtained soluble in water while giving a greenish yellow colour. the dyestuff yielded in the presence of sodium hydroxide or sodium carbonate on regenerated cellulose clear greenish yellow dyeings having good fastness to light and wetting.

EXAMPLE 4

A solution of 43 parts of β-hydroxyethyl-[3-(4'-aminobenzoylamino)-phenyl]-sulfone phosphoric acid monoester in 300 parts by volume of water was diazotized in known manner with 25 parts by volume of 5N sodium nitrite solution at 5°–10° C. and adjusted subsequently, to a pH of 6–6.5. The obtained diazo suspension was then allowed to run into a solution of 39.3 parts of 8-acetylamino-1-hydroxy-naphthalene-3.6-disulfonic acid of 92% strength in 150 parts by volume of water. By addition of sodium carbonate coupling was effected at a pH in the range from 6 to 6.5. After completion of the reaction, the pH was adjusted to 1 and the dyestuff salted out with sodium chloride. The monoazo dyestuff which in form of the free acid corresponded to the formula was filtered off, washed with sodium chloride solution and dried.

A red powder was obtained soluble in water with red colour. The new dyestuff yielded on cotton fabrics in the presence of sodium hydroxide brilliant red dyeings and prints remarkably fast to light and to wet.

EXAMPLE 5

48.0 parts of the compound of formula

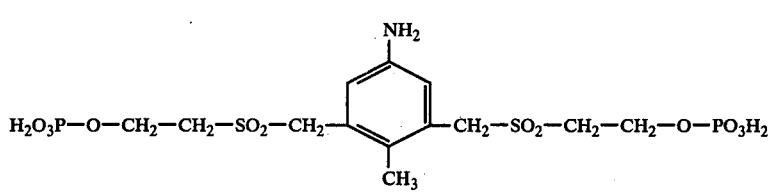

were mixed in 310 parts by volume of water with 25 parts by volume of concentrated hydrochloric acid and diazotized in known manner with 20 parts by volume of 5N sodium nitrite solution at 5°–10° C. Subsequently, the mixture was adjusted with sodium carbonate to a pH between 6 and 6.5 and combined with a neutral solution of 34 parts of β-hydroxy-ethyl-[4-hydroxynaphthyl-(1)]-sulfone phosphoric acid monoester in 290 parts by volume of water. By addition of sodium bicarbonate the pH was maintained between 5 and 6. When coupling was complete, the monoazo dyestuff formed which in form of the free acid corresponded to the formula

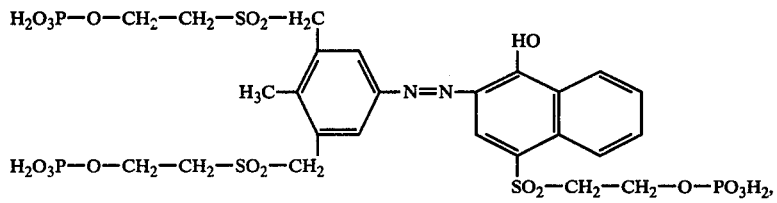

was isolated by spray drying. An orange-red saliferous powder was obtained soluble in water while giving an orange-red colour. The dyestuff yielded on cotton fabrics in the presence of sodium carbonate a reddish orange print very fast to light and to wet.

EXAMPLE 6

10 parts of the dyestuff obtained by coupling of diazotized β-hydroxyethyl-(4-methoxy-3-amninophenyl)-sul-

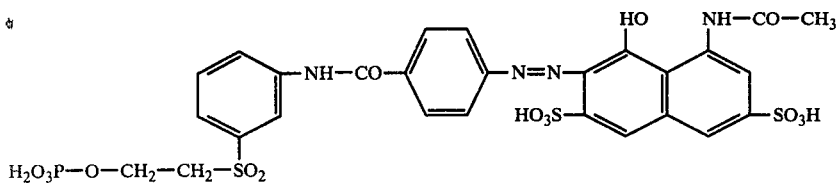

fone with 1-hydroxy-naphthalene-4-sulfonic acid of formula

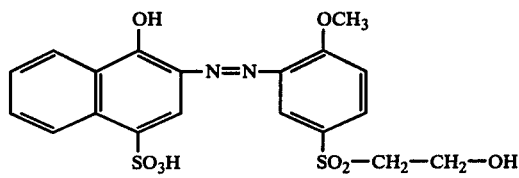

were mixed with 50 parts of pyrophosphoric acid and heated for one hour to 100° C. Then, at 80° C., 75 parts of water were added and the batch was heated for another hour to 100° C. After cooling, the solution was run into 100 parts by volume of saturated sodium chloride solution. After a short stirring the dyestuff was sucked off and washed with a small amount of salt solution. After drying, 21.1 parts of a saliferous dyestuff were obtqined which in form of the free acid corresponded to the formula

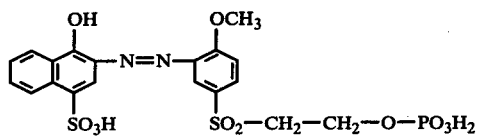

The dyestuff yielded on cellulosic materials in the presence of alkaline agents a brilliant scarlet dyeing very fast to wet and to light.

EXAMPLE 7

10 parts of the dyestuff obtained by coupling of diazotized β-hydroxy-ethyl-(4-methoxy-3-aminophenyl)-sulfone with 8-acetylamino-1-hydroxy-naphthalene-3,6-disulfonic acid of formula

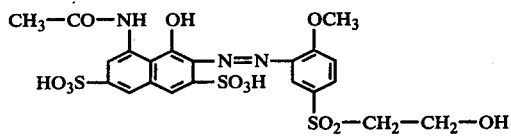

were mixed, while stirring, with 50 parts of polyphosphoric acid and heated for one hour to 100° C. At 80° C., 75 parts of water were added and the batch was heated for another hour to 100° C. After cooling, the solution was stirred into 100 parts by volume of saturated sodium chloride solution at a temperature between 0° and 10° C. The dyestuff was sucked off after a short time, washed with a small amount of salt solution and dried. It was obtained as a red saliferous powder which in form of the free acid corresponded to the formula

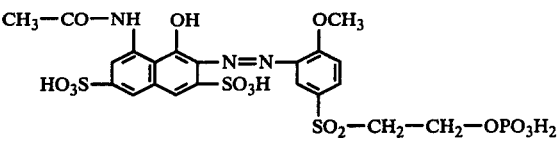

and yielded on cotton in the presence of alkaline agents a bluish red dyeing having good fastness to light and to wetting.

The same dyestuff was obtained, when in the preceding Example instead of 50 parts of polyphosphoric acid the same amount of acid polyphosphoric acid methyl ester with a $P_2O_5$ content of 76.8% and a methyl content of 1.5% were used, the reaction mixture was heated for two hours to 130°–135° C. instead of heating for one hour to 100° C. proceeding otherwise as described above.

EXAMPLE 8

10 parts of the dyestuff obtained by coupling diazotized β-hydroxy-ethyl-(3-aminophenyl)-sulfone with 7-acetylamino-1-hydroxy-naphthalene-3-sulfonic acid of formula

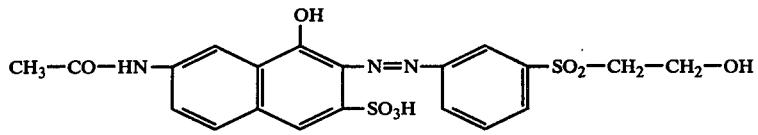

were heated for about 90 to 120 minutes with 50 ml of phosphorus oxychloride to 70° C. while stirring and passing nitrogen through the solution, whereupon the excess phosphorus oxychloride was removed in vacuo and the residue run into 150 parts of iced water while stirring. Subsequently, the sodium carbonate solution was neutralized the dyestuff filtered off and the solution evaporated to dryness in vacuo. The dyestuff was obtained as a saliferous powder which in form of the free acid corresponded to the formula

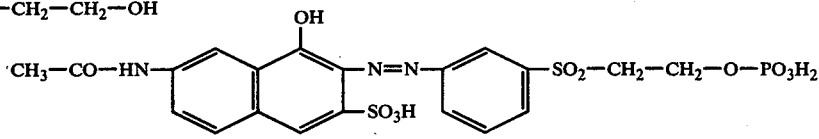

and yielded on cotton fabrics in the presence of sodium carbonate reddish orange dyeings and prints having very good fastness to light and to wet.

The following table lists further valuable monoazo dyestuffs obtainable according to the preceding Examples as well as the shades produced with these dyestuffs on cotton or wool.

| diazo component | coupling component | phosphorylating agent | shade on cotton or wool |
|---|---|---|---|
| β-hydroxyethyl-(4- | 1-hydroxy-naphthalene | phosphorus oxytrichloride | red |

-continued

| diazo component | coupling component | phosphorylating agent | shade on cotton or wool |
|---|---|---|---|
| methoxy-3-aminophenyl)-sulfone | 5-sulfonic acid | | |
| β-hydroxyethyl-(4-methoxy-3-amino-phenyl)-sulfone | 7-acetylamino-1-hydroxy-naphthalene-3-sulfonic acid | pyrophosphoric acid | scarlet |
| β-hydroxyethyl-(4-methoxy-3-aminophenyl)-sulfone | 1-benzoylamino-8-hydroxy-naphthalene-4.6-disulfonic acid | pyrophosphoric acid | red |
| β-hydroxyethyl-(4-methoxy-3-aminophenyl)-sulfone | 1-hydroxy-naphthalene-4-sulfonic acid | phosphorus oxytrichloride | scarlet |
| β-hydroxyethyl-(3-amino-phenyl)-sulfone-phosphoric acid-monoester | 1-hydroxyethyl-naphthalene-4-sulfonic acid | — | reddish orange |
| β-hydroxyethyl-(3-amino-phenyl)-sulfone-phosphoric acid-monoester | 7-acetylamino-1-hydroxyethyl naphthalene-3-sulfonic acid | — | reddish orange |
| β-hydroxyethyl-(3-amino-phenyl)-sulfone-phosphoric acid-monoester | 6-acetylamino-1-hydroxyethyl naphthalene-3-sulfonic acid | — | yellowish orange |
| β-hydroxyethyl-(3-amino-phenyl)-sulfone-phosphoric acid-monoester | 1-benzoylamino-8-hydroxyethyl naphthalene-4.6-disulfonic acid | — | yellowish red |
| β-hydroxyethyl-amino-phenyl)-sulfone-phosphoric acid monoester | β-hydroxyethyl-(2.5-di-methoxy-4-acetoacetyl-aminophenyl)-sulfone-phosphoric acid-monoester | phosphorus oxytrichloride | greenish yellow |
| β-hydroxyethyl-(3-amino-phenyl)-sulfone-phosphoric acid-monoester | β-hydroxyethyl-[4-hydroxy-naphthyl-(1)]-sulfone-phosphoric acid-monoester | — | reddish orange |
| β-(α-methyl-M-isoethio-nylamino)-1-ainobenzene-phosphoric acid-monoester | 8-acetylamino-1-hydroxy-naphthalene-3.6-disulfonic acid | — | bluish red |
| β-(N-butyl-M-isoethionyl-amino)-1-amino-benzene-phosphoric acid-monoester | 8-acetylamino-1-hydroxy-naphthalene-3.6-disulfonic acid | — | bluish red |
| β-isoethionylamino-1-aminobenzene-phosphoric acid-monoester | 8-acetylamino-1-hydroxy-naphthalene-3.6-disulfonic acid | — | red |
| β-hydroxyethyl-(2.5-dimethoxy-4-amino-phenyl)-sulfone-phosphoric acid-monoester | 7-acetylamino-1-hydroxy-naphthalene-3-sulfonic acid | — | red |
| βhydroxyethyl-[4-amino-naphthyl-(1)]-sulfone | 7-acetylamino-1-hydroxy-naphthalene-3-sulfonic acid | pyrophosphoric acid | red |
| 2-trifluoromethyl-4(M-methyl-M-isoethionyl-amino)-1-aminobenzene-phosphoric acid-mono-ester | 1-hydroxy-naphthalene-4-sulfonic acid | — | scarlet |
| β-hydroxyethyl-(4-ethoxy-3-amino-phenyl)-sulfone-phosphoric acid-monoester | 1-hydroxy-naphthalene-5-sulfonic acid | — | red |
| 1-aminobenzene-2-carboxylic acid | 6-[3'-(β-hydroxyethyl-sulfonyl)-benzoylamino]-1-hydroxy-naphthalene-3-sulfonic acid | pyrophosphoric acid | orange |
| 6-nitro-2-amino-naphthalene-4.8-di-sulfonic acid | 6-[3'-(β-hydroxyethyl-sulfonyl)-benzoylamino]-1-hydroxy-naphthalene-3-sulfonic acid | pyrophosphoric acid | reddish orange |
| 4-amino-benzene-1-sulfoneamide | 6-[3'-(β-hydroxyethyl-sulfonyl)-benzoylamino]-1-hydroxy-naphthalene-3-sulfonic acid | pyrophosphoric acid | orange |
| β-hydroxyethyl-(4'-amino-diphenyl)-sulfone-phosphoric acid-mono-ester | 8-acetylamino-1-hydroxy-naphthalene-3.6-disulfonic acid | pyrophosphoric acid | red |
| 2-amino-4-(β-phosphato-hydroxy-ethyl-sulfonyl)-diphenyl-ester-4'-sulfonic acid | 8-acetylamino-1-hydroxy-naphthalene-3,6-disulfonic acid | — | bluish red |
| 1-chloro-2-amino-benzene-1-carboxylic acid | β-hydroxyethyl-[6-hydroxy-naphthyl-(2)]-sulfone-phosphoric acid-monoester | — | orange |
| 4-cyano-1-amino-benzene | β-hydroxyethyl-[6-hydroxy-naphthyl-(2)]-sulfonic acid phosphoric acid-monoester | — | orange |
| 4-butyl-1-amino-benzene | β-hydroxyethyl-[6-hydroxy-naphthyl-(2)]-sulfone-phosphoric acid-monoester | — | orange |
| 4-nitro-diphenyl-4'-sulfonic acid | 7-(N-methyl-N-isothionyl-amino)-1-hydroxynaphthalene-3-sulfonic-phosphoric acid-monoester | — | scarlet |
| 4-fluoro-1-amino-benzene | 7-(N-methyl-N-isoethionyl-amino)-1-hydroxynaphthalene-3-sulfonic acid-phosphoric | — | reddish orange |

-continued

| diazo component | coupling component | phosphorylating agent | shade on cotton or wool |
|---|---|---|---|
| β-hydroxyethyl-(3-bromo-4-amino-phenyl)-sulfone-phosphoric acid-monoester | acid-monoester diphenylamine | pyrophosphoric acid | reddish orange |
| β-hydroxyethyl-(2.5-dimethoxy-4-amino-phenyl)-sulfone-phosphoric acid-monoester | 7-(4'-carboxy-phenylamino)-1-hydroxynaphthalene-3-sulfonic acid | — | brown |
| β-hydroxyethyl-(4-amino-phenyl)-sulfone-phosphoric acid-monoester | 1-amino-naphthalene-4-sulfonic acid | — | reddish orange |
| β-hydroxyethyl-(4-amino-phenyl)-sulfone-phosphoric acid-monoester | 2-amino-naphthalene-5.7-disulfonic acid | — | orange |
| β-hydroxyethyl-(2.6-dichloro-4-amino-phenyl)-sulfonephosphoric acid-monoester | 3-chloro-1-diethylamino-benzene | — | orange |
| 4-amino-benzene-sulfonic acid amide | 7-(N-methyl-N-isoethionyl-amino)-1-hydroxynaphthalene-3-sulfonic acid-phosphoric acid-monoester | — | orange |
| methyl-(4-amino-phenyl)-sulfone | 7-(N-methyl-N-isoethionyl-amino)-1-hydoxynaphthalene-3-sulfonic acid-phosphoric acid-monoester | pyrophosphoric acid | orange |
| 4-amino-benzene-carboxylic acid | 7-(N-methyl-N-isoethionyl-amino)-1-hydroxynaphthalene-3-sulfonic acid-phosphoric acid-monoester | — | orange |
| 6-(K-methyl-isoethionyl-amino)-2-amino-naphthalene-6.8-disulfonic acid-phosphoric acid monoester | 1-hydroxy-naphthalene-3.6.8-trisulfonic acid | — | red |
| 4-(K-methyl-H-isoethionyl-amino)-1-amino-benzene-phosphoric acid monoester | 8-hydroxyquinoline-4-sulfonic acid | — | brown |
| 2-nitro-4-(β-hydroxy-ethylsulfonyl)-4'-amino-diphenylsulfone-phosphoric acid-monoester | 1-hydroxy-naphthalene-3.6.8-trisulfonic acid | — | red |
| 2-nitro-4-(β-hydroxy-ethylsulfonyl)-4'-amino-diphenylsulfide-phosphoric acid-monoester | 1-hydroxy-naphthalene-3.6.8-trisulfonic acid | — | red |
| 4-(N-methyl-N-isoethionyl-amino)-4'-amino-diphenyl-ketone-phosphoric acid-monoester | 2-hydroxy-naphthalene-6-sulfonic acid | pyrophosphoric acid | scarlet |
| N-(3'-aminophenyl)-benzene-sulfonic acid-amide | β-hydroxyethyl-[5-hydroxy-naphthyl-(1)]-sulfone-phosphoric acid-monoester | — | red |
| N-(3'aminophenyl)-benzene-carboxylic acid-amide | β-hydroxyethyl-[5-hydroxy naphthyl-(1)]-sulfone-phosphoric acid-monoester | — | red |
| N-[naphthyl (2)-4'-8'-disulfonic acid]-4-amino-benzene-carboxylic acid-amino | β-hydroxyethyl-(2.5-dimethoxy-4-acetoacetyl-amino-phenyl)-sulfone-phosphoric acid-mono-ester | — | greenish yellow |
| β-hydroxyethyl-(3-amino-6-methoxy-phenyl)-sulfone-phosphoric acid-monoester | 8-benzoylamino-1-hydroxy-naphthalene-acid | — | bluish red |
| β-hydroxyethyl-(4-amino-phenyl)-sulfone-phosphoric acid-monoester | 1-hydroxy-naphthalene-3.6-disulfonic acid | — | reddish orange |
| β-hydroxyethyl-(4-amino-phenyl(-sulfone-phosphoric acid-monoester | 6-acetylamino-1-hydroxy-naphthalene-3-sulfonic acid | — | orange |

What is claimed is:
1. A water-soluble monoazo dyestuff having, in the form of the free acid, the formula

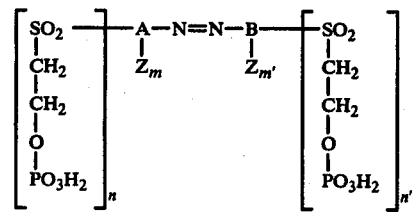

wherein:
- A is phenyl, naphthyl or phenyl substituted by lower alkyl, lower alkyl sulfonyl, lower alkoxy, trifluoromethyl, cyano, chlorine, bromine, sulfonamide or carbamoyl;
- B is hydroxynaphthylene or hydroxynaphthalene substituted by lower alkanoylamino or benzoylamino;
- Z is —SO₃H or —COOH;
- n is 0 or 1;
- n' is 0 or 1;
- m is 0, 1 or 2;
- m' is 0, 1, 2 or 3;
- n and n' together are 1; and
- m and m' together are 1, 2 or 3.

2. The dyestuff defined in claim 1 of the formula

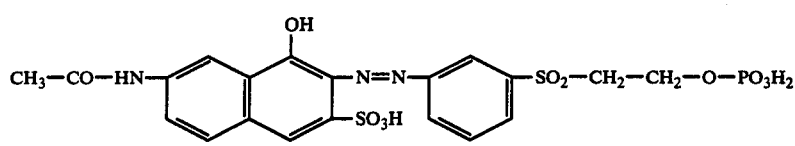

3. The dyestuff defined in claim 1 of the formula

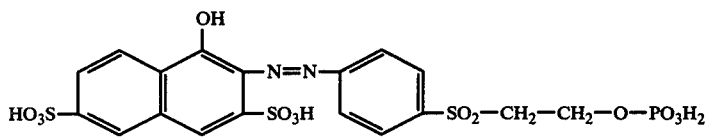

4. The dyestuff defined in claim 1 of the formula

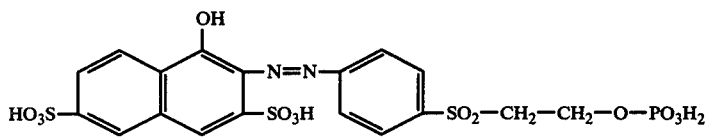

5. The dyestuff defined in claim 1 of the formula

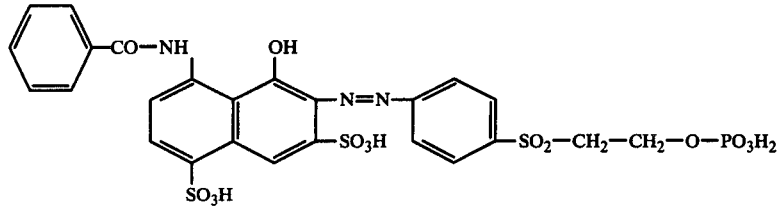

6. The dyestuff defined in claim 1 of the formula

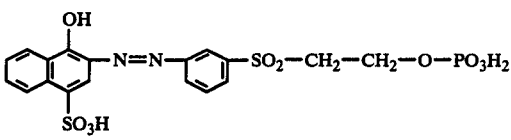

7. The dyestuff defined in claim 1 of the formula

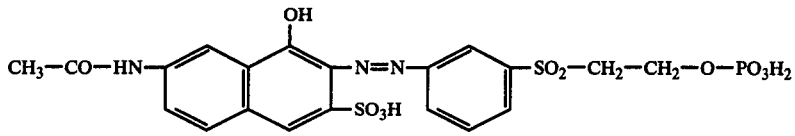

8. The dyestuff defined in claim 1 of the formula

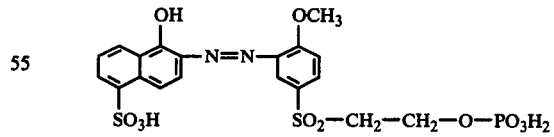

9. The dyestuff defined in claim 1 of the formula

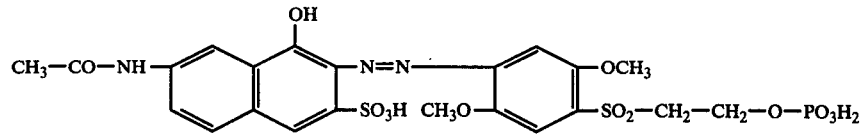

* * * * *